Feb. 20, 1923.
D. G. LITTLE.
QUEEN EXCLUDING HONEY BOARD.
FILED JULY 30, 1918.
1,445,778.
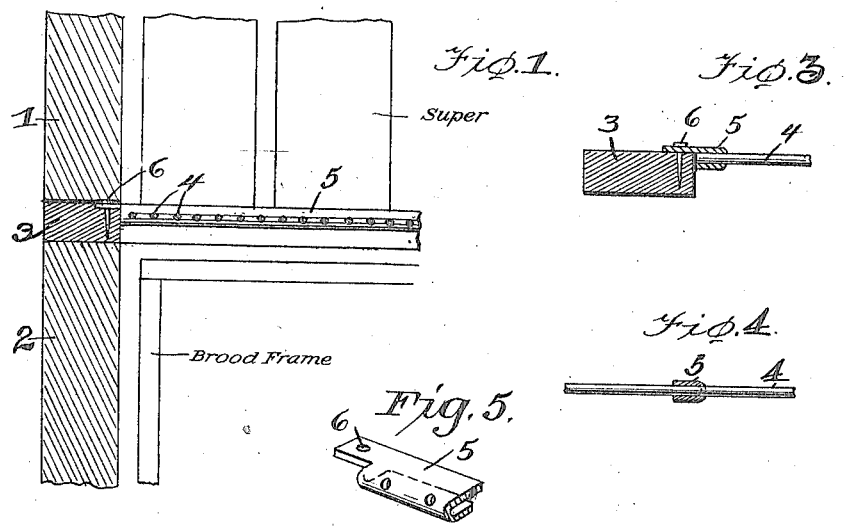
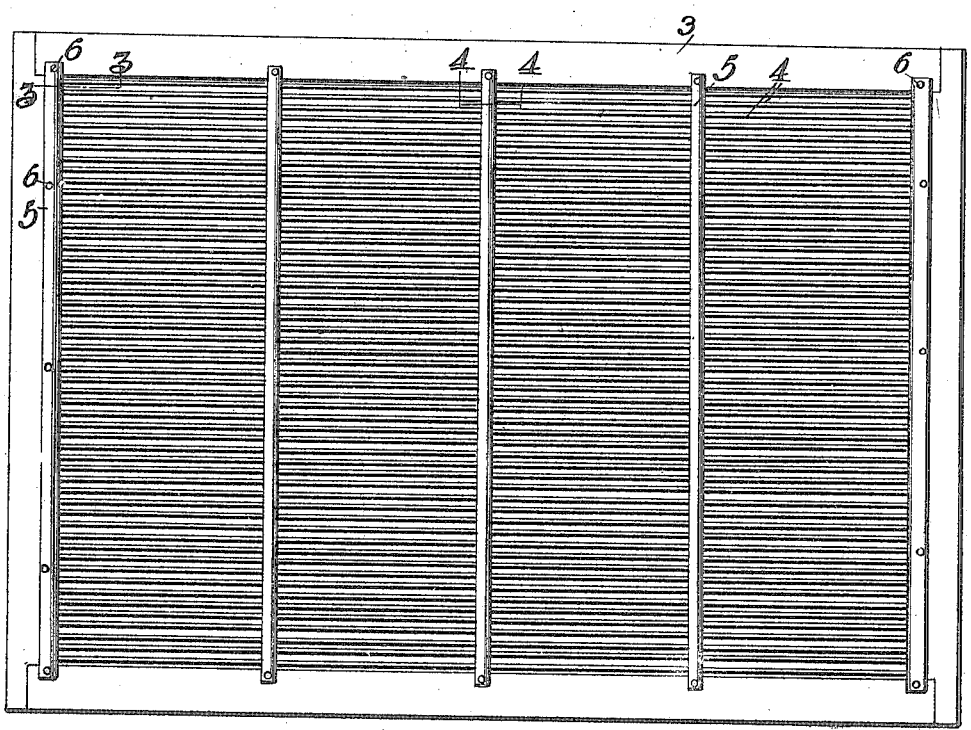
WITNESSES
R E Rousseau
J. P. Schrott
INVENTOR
D. G. Little,
BY Munn & Co.
ATTORNEYS Patented Feb. 20, 1923.

1,445,778

UNITED STATES PATENT OFFICE.

DANIEL GRISWOLD LITTLE, OF HARTLEY, IOWA.

QUEEN-EXCLUDING HONEY BOARD.

Application filed July 30, 1918. Serial No. 247,436.

*To all whom it may concern:*

Be it known that I, DANIEL G. LITTLE, a citizen of the United States, and a resident of Hartley, in the county of O'Brien and State of Iowa, have invented certain new and useful Improvements in Queen-Excluding Honey Boards, of which the following is a specification.

My invention relates to improvements in beehives, it being more particularly an improvement in queen-excluding devices, and it consists substantially in the construction and arrangement herein described and claimed.

An object of my invention is to provide a honey board arranged to be placed between the super and the brood chamber of a beehive, to prevent the queen from entering the super and depositing eggs among the combs, when it is desired to obtain pure honey.

Another object of the invention resides in the peculiar manner of constructing the honey board, to which considerable importance is attached, said manner of construction including the improved means for fastening the cross stays whereby pulling apart of the frame is prevented.

Other objects and advantages will appear in the following specification, reference being had to the accompanying drawing, in which:

Figure 1 is a detail sectional view illustrating a portion of the honey board and showing how it is applied to a beehive.

Figure 2 is a plan view of the improved honey board.

Figure 3 is a detail sectional view on the line 3—3 of Figure 2,

Figure 4 is a detail sectional view on the line 4—4 of Figure 2, and, Figure 5 is a detail perspective view of the upper end of the extreme right cross stay in Figure 2, showing how a part is cut away beneath to produce a securing ear and abutting shoulder.

As has already been stated, the honey board is arranged to be set in place between the super 1 and the brood chamber 2 of a beehive. The honey board consists of a wooden frame 3. The side and end members of the frame are joined together in any suitable manner, and it is to be observed that they are equal in width to the thickness of the walls of the super and brood frames so that no part of the board 3 projects on the inside and consequently, the objection of the gluing together of the parts at the joints by the bees on the inside, is avoided.

A grid is supported on the board 3 filling the entire inside of the frame and this consists of a plurality of wires 4 spaced apart an exact bee-space. That is to say, the wires 4 are spaced far enough apart to admit the worker bees and thus consequently exclude the queen bee for the reason that the body of the queen bee is slightly larger than that of the worker bee.

The wires 4 are supported in place by a number of cross stays 5 which are secured in place on the honey board 3 by any suitable means such as nails 6. The cross stays 5 are made of perforated and folded sheet metal strips as clearly shown in Figures 3 and 4. It is to be observed in Figure 3 that the lower bent edge of each of the side stays, is shorter than the upper edge. In other words, the edge of the lower portion of the stay abuts the side of the end member of the honey board, while the upper edge overlaps the top of the end member and thus affords a place for a number of the nails 6.

A somewhat similar arrangement is made on the ends of the intermediate stays. Here the bottom edges are cut off a short distance in from the end so as to leave ears which fit on top of the side members of the honey board to afford a place for the nails 6. This construction is shown in Figure 1. This fastening arrangement makes a very secure excluder, because the nails being driven in at right angles to the direction of lateral pull when removing the frame from the hive, prevents the side rails from being strained and pulled away from the grid. It is intended that the honey board be used to exclude the queen from the super at the top when it is desired to obtain absolutely pure honey. One of the foremost advantages of the device is, the simplicity of the construction thereof.

While the construction and arrangement of the device as herein described and claimed is that of a generally preferred form, obviously modifications and changes may be made without departing from the spirit of the invention or the scope of the claims.

I claim:—

1. Grid attaching means in a queen excluder, comprising a bent metallic strip perforated for grid wires, with under portions at the extremities removed to provide rail abutments, and leave top securing ears.

2. Grid attaching means in a queen excluder, comprising a perforated substantially U-shaped strip, the bottom portion being narrower than the top to provide an end rail abutment and top securing flange, the extremities of the bottom portion being removed to provide side rail abutments and leave top securing ears.

DANIEL GRISWOLD LITTLE.

Witnesses:
B. L. LORENZEN,
G. E. KNAACK.